United States Patent [19]
Yang

[11] Patent Number: 5,889,559
[45] Date of Patent: Mar. 30, 1999

[54] METHOD AND APPARATUS FOR MINIMALLY-SHIFTED WAVELET DECOMPOSITION AND RECOMPOSITION

[75] Inventor: Liuyang Yang, Portland, Oreg.

[73] Assignee: Intel Coproration, Santa Clara, Calif.

[21] Appl. No.: 979,395

[22] Filed: Nov. 26, 1997

Related U.S. Application Data

[63] Continuation of Ser. No. 783,621, Jan. 14, 1997, abandoned.

[51] Int. Cl.$^6$ ..................................................... H04N 7/30
[52] U.S. Cl. ............................................................ 348/398
[58] Field of Search ................................... 348/384, 397, 348/398, 413; H04N 7/30

[56] References Cited

U.S. PATENT DOCUMENTS

| | | | |
|---|---|---|---|
| 5,420,891 | 5/1995 | Akansu | 348/398 |
| 5,497,435 | 3/1996 | Berger | 348/397 |
| 5,565,920 | 10/1996 | Lee | 348/398 |
| 5,592,226 | 1/1997 | Lee | 348/413 |
| 5,659,363 | 8/1997 | Wilkinson | 348/398 |
| 5,777,678 | 7/1998 | Ogata | 348/398 |
| 5,808,683 | 9/1998 | Tong | 348/398 |

OTHER PUBLICATIONS

Martucci and Mersereau, The Symmetric Convolution Approach To The Nonexpansive Implementation Of Fir Filter Banks For Images, IEEE Conference on Acoustics, Speech, and Signal Processing, vol. V, pp. V–65—V68, Minneapolis, Minnesota, Apr. 1993.

Smith and Eddins, Analysis/Synthesis Techniques for Subband Image Coding, IEEE Transactions on Acoustics, Speech, and Signal Processing, vol. 38, No. 8, pp. 1446–1456, Aug. 1990.

Villasenor, Belzer, and Liao, Wavelet Filter Evaluation for Image Compression, IEEE Transactions on Image Processing, vol. 4, No. 8, pp. 1053–1060, Aug. 1995.

Vaidyanathan, Multirate Digital Filters, Filter Banks, Polyphase Networks, and Applications: A Tutorial, Proceedings of the IEEE, vol. 8, No. 1 pp. 56–93, Jan. 1990.

*Primary Examiner*—Howard Britton
*Attorney, Agent, or Firm*—Blakely, Sokoloff, Taylor & Zafman LLP

[57] ABSTRACT

The present invention relates to a system for decomposing and recomposing wavelets with minimum filter delay. The system includes multiple low-pass filters and multiple high-pass filters. Each filter in the system has associated filter coefficients. A filter shift value is selected for each filter such that the sum of the shift values for the low-pass filters equals the sum of the shift values for the high-pass filters. The filter coefficients for each filter are shifted according to the shift value associated with the filter. The filter shift values are selected such that the filter shift values associated with a first low-pass filter and the filter shift value associated with a first high-pass filter are both even or both odd. The system can provide center-aligned filters as well as a perfect reconstruction filter bank.

21 Claims, 9 Drawing Sheets

| 0 | 1 | 4 | 5 |
|---|---|---|---|
| 2 | 3 | 6 | 7 |
| 8 | 9 | 12 | 13 |
| 10 | 11 | 14 | 15 |

METHOD AND APPARATUS FOR MINIMALLY-SHIFTED WAVELET DECOMPOSITION AND RECOMPOSITION

This is a continuation of application Ser. No. 08/783,621, filed Jan. 14, 1997, now abandoned.

BACKGROUND OF THE INVENTION

1. Field of the Invention

The present invention relates to a system for processing signals or data. More specifically, the invention relates to a system for decomposing and recomposing wavelets with minimum filter delay.

2. Background

As the transmission size or transmission rate of video data increases, the need for effective and efficient compression and decompression becomes more important. Although compression and decompression techniques are important, these techniques must be performed in a manner that preserves the quality of the image or video data being transmitted. Thus, competing goals exist in 1) maximizing the compression of video data to minimize transmission time along a transmission medium and 2) providing a high quality image after transmission and decompression of the video data. Minimizing transmission time is particularly important in systems transmitting real-time video data.

Using known techniques, it is possible to maximize compression, thereby minimizing transmission time or transmission bandwidth, by sacrificing image quality. Conversely, known techniques are available for providing a high quality decompressed image by performing a minimal amount of compression, thereby increasing the required transmission time or transmission bandwidth.

Other known image processing systems use a conventional block transform technique such as Discrete Cosine Transform (DCT). DCT transforms an image one dimension at a time. DCT first evaluates an image and converts the image into horizontal pixel values. Next, DCT evaluates the image and converts the image into vertical pixel values. This type of block transform technique generates large digitized data files associated with the image. Additionally, since the image is evaluated twice, the image is accessed from memory twice, thereby increasing the overall processing time.

Other image processing systems use techniques involving wavelet technology. A wavelet transforms an image into multiple frequency bands. Each frequency band contains the image at a quarter resolution of the original image, in varying degrees of image quality. As the bands progress from a low frequency to a high frequency, the image quality increases. The lowest frequency band is generally the most important band for visual sensitivity. Therefore, the lowest frequency band is typically the first band transmitted, and the highest frequency band is typically the last band transmitted. Thus, if only the low frequency band is received, the major features of the image are visible even though the information contained in the remaining higher frequency bands is not displayed.

When wavelet techniques are used in a CODEC (Coder-Decoder) system, the CODEC consists of a wavelet decomposition module that breaks the image into bands with lower resolution and a wavelet recomposition module that transforms bands into the image with original resolution.

A wavelet composition module calculates a compressed value of a particular pixel by determining the pixel values of pixels surrounding the particular pixel. Using various averaging techniques, the compressed value for the particular pixel is calculated. This type of pixel calculation is slow due to the time-consuming and calculation-intensive process involved in determining surrounding pixel values for each pixel in the image.

A filtering operation is performed during a wavelet decomposition procedure and a wavelet recomposition procedure. Known techniques for implementing the filtering operation generally cause filter delay (i.e., a time delay as the wavelet is decomposed or recomposed).

It is therefore desirable to provide a technique for efficiently composing and decomposing wavelets without the delay associated with known systems.

SUMMARY OF THE INVENTION

Embodiments of the present invention provide a system for decomposing and recomposing wavelets while minimizing filter delay. The system provides a high quality reconstruction of the original image by providing a perfect reconstruction wavelet filter bank that remains perfectly reconstructed while minimizing filter delay. Embodiments of the invention also reduce the computational complexity of the wavelet calculations, thereby reducing image processing time.

A particular embodiment of the invention provides a system for shifting filter coefficients in a filter system having multiple high-pass filters and multiple low-pass filters. Each filter has an associated set of filter coefficients. A filter shift value is selected for each filter in the system. The filter shift values are selected such that the sum of the shift values for the low-pass filters equals the sum of the shift values for the high-pass filters. The filter coefficients for each filter are shifted according to the shift value associated with the filter.

Another embodiment of the invention selects the filter shift values such that the filter shift value associated with a first low-pass filter is odd and the filter shift value associated with a first high-pass filter is odd.

Other embodiments of the invention select the filter shift values such that the filter shift value associated with a first low-pass filter is even and the filter shift value associated with a first high-pass filter is even.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, components, and circuits have not been described in detail so as not to obscure the invention.

Embodiments of the present invention provide a system for processing video images including the encoding and decoding of video image data. The image processing system provides improved image quality and improved scalability of the image data. Additionally, the system eliminates the need to predict and compensate for the filter delay, as required by previous image processing systems.

Particular embodiments of the invention utilize wavelets to transmit video image data between a source and a destination. A wavelet is a mathematical transform used to decompose (or encode) video image data into multiple bands. A digital filtering system is used to process the image data and generate the multiple bands of data.

Figure 1:
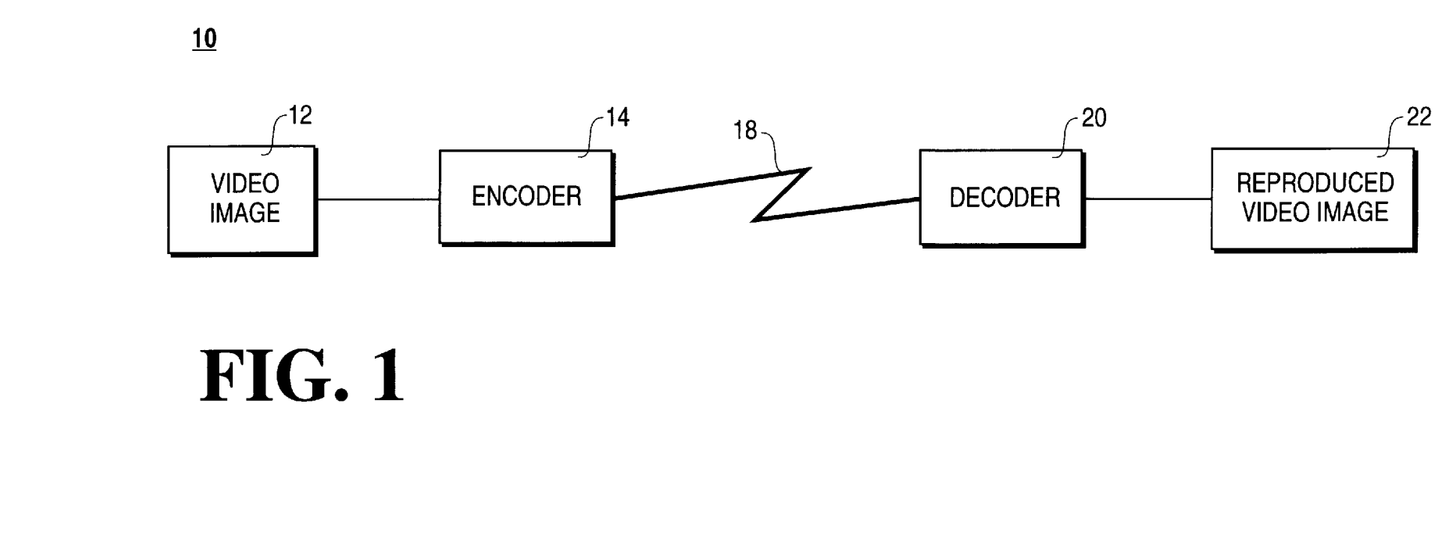
FIG. 1 illustrates an embodiment of an image processing system capable of implementing the teachings of the present invention.

FIG. 1 illustrates an embodiment of an image processing system 10 capable of implementing the teachings of the present invention. Image processing system 10 includes a video image device 12 capable of capturing, generating, or receiving a video image. Video image device 12 may include a camera, recording device, or other mechanism capable of generating a signal representative of a video image. The signal representing the video image is transmitted from device 12 to an encoder 14. The video image signal may, for example, be a stream of pixel data. Encoder 14 receives the video image signal and performs various decomposition and compression procedures on the signal and transmits the signal across a communication medium 18. Communication medium 18 may include wires, cables, radio-frequency links, or any other medium capable of propagating signals from a source to a destination. Additional details regarding the procedures performed by encoder 14 are provided below.

The video image signal is transmitted across communication medium 18 to a decoder 20. Decoder 20 decodes (or recomposes) the received video image signal to generate a reproduced video image 22 representing the video image captured, generated, or received by device 12. The procedures used to decode the video image are discussed below. The image processing components illustrated in FIG. 1 may be implemented in devices customized for video processing. Alternatively, one or more functions performed by the image processing components of FIG. 1 may be implemented by hardware components or software programs in a computer, as discussed below. In alternate embodiments of the invention, one or more storage devices may be utilized to store image data at different stages of the encoding and decoding process.

Figure 2:
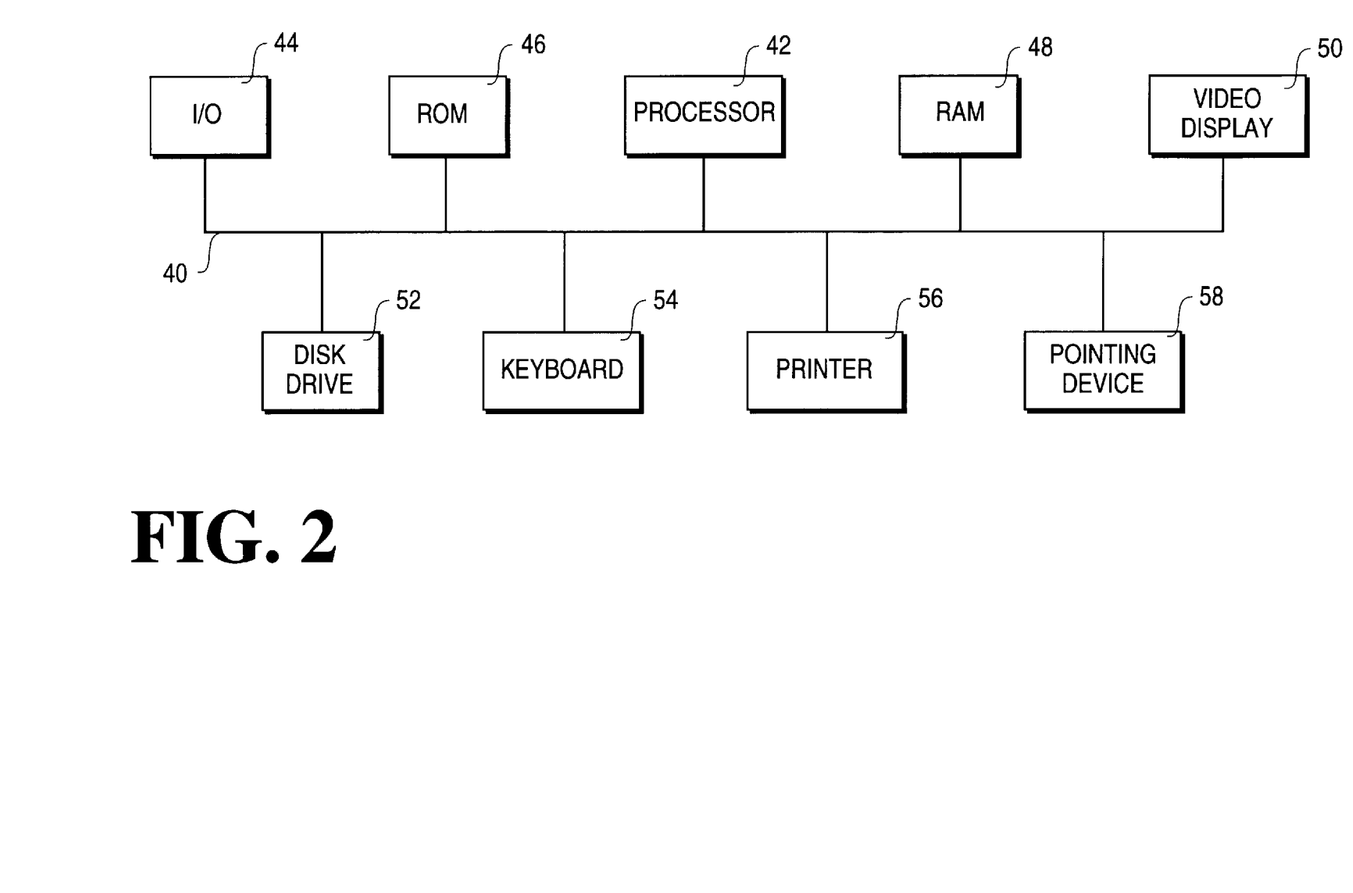
FIG. 2 illustrates an embodiment of a computer capable of performing various image processing functions in accordance with the invention.

FIG. 2 illustrates a particular embodiment of a computer capable of performing various image processing functions in accordance with the invention. The various components shown in FIG. 2 are provided by way of example only. Those of ordinary skill in the art will appreciate that certain components of the computer illustrated in FIG. 2 can be deleted for particular implementations of the invention. The computer shown in FIG. 2 may be any type of computer including a general purpose computer.

FIG. 2 illustrates a system bus 40 coupled to various components of the computer. A processor 42 performs the processing tasks, such as image processing functions, required by the computer. Processor 42 may be any type of processing device capable of implementing the procedures necessary to process the video data, as discussed below. An input/output (I/O) device 44 is coupled to bus 40 and provides a mechanism for communicating with other devices coupled to the computer. For example, I/O device 44 may be coupled to receive video image signals from a video capture device such as a camera. Additionally, I/O device 44 may be coupled to communication medium 18 (FIG. 1) to transmit video image data to a destination device.

A read-only memory (ROM) 46 and a random access memory (RAM) 48 are coupled to bus 40 and provide storage mechanisms for the various data and information used by processor 42. Although ROM 46 and RAM 48 are shown coupled to bus 40, in alternate embodiments of the invention, ROM 46 and RAM 48 can be coupled directly to processor 42 or coupled to a separate memory bus.

A video display 50 is coupled to bus 40 and displays various information and data to the user of the computer. A disk drive 52 is coupled to bus 40 and provides for the long-term mass storage of information. Disk drive 52 may be used to store various images, software programs, and other data generated or utilized by the computer system. A keyboard 54 and pointing device 58 are coupled to bus 40 and provide mechanisms for entering information and commands to the computer. A printer 56 is coupled to bus 40 and capable of creating a hard-copy of information generated or stored by the computer.

Figure 3:
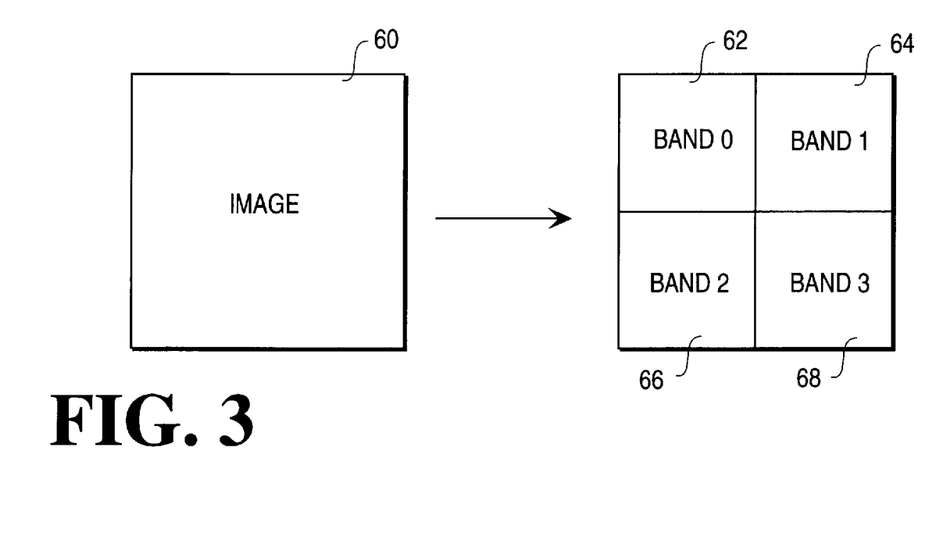
FIG. 3 illustrates the decomposition of a video image into four separate bands.

Embodiments of the invention utilize wavelets to decompose a video image into multiple bands of video image data. FIG. 3 illustrates the decomposition of a video image into four separate bands, labeled Band 0, Band 1, Band 2, and Band 3. The decomposition illustrated in FIG. 3 is performed using a wavelet transformation. The wavelet transformation decomposes an original video image 60 into four smaller images 62, 64, 66, and 68 (Band 0, Band 1, Band 2, and Band 3, respectively). The information contained in each band 62–68 is determined by selecting various combinations of high frequency components and low frequency components of the original image. These high frequency and low frequency image components are identified using a filter bank, which includes low-pass and high-pass decomposition filters, and low-pass and high-pass synthesis recomposition filters. The decomposition filters are also be referred to as analysis filters and the recomposition filters are also be referred to as synthesis filters. These filters are discussed in greater detail below.

Band 0 typically contains the low frequency information in both the horizontal and vertical directions. Therefore, Band 0 represents the entire image 60, but does not provide sharp, well-defined edges. Thus, the Band 0 image appears "fuzzy." The remaining bands provide additional data to sharpen or define the edges within the image. For example, Band 1 contains the high frequency components in the horizontal direction and the low frequency components in the vertical direction. Band 2 contains the high frequency components in the vertical direction and the low frequency components in the horizontal direction. Band 3 contains the high frequency components in both the horizontal and vertical directions, thereby identifying diagonal edges within the image.

The low frequency image components, such as those contained in Band 0, are the most important image components for visual sensitivity. Thus, the Band 0 data alone provides sufficient image data for a person to appreciate the major aspects of the image. The remaining three bands, Band 1–Band 3, provide edges and additional detail to the image provided in Band 0.

Figure 4:
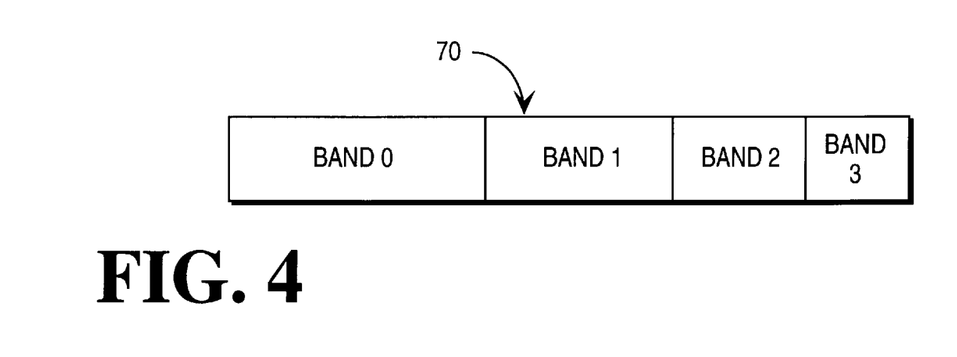
FIG. 4 illustrates an arrangement of multiple bands into a bit stream.

FIG. 4 illustrates an example arrangement of Band 0–Band 3 into a bit stream (or image file) 70. In the example of FIG. 4, Band 0 typically contains significantly more information than the remaining bands (Band 1–Band 3). As mentioned above, the compressed image may be illustrated using only information contained in Band 0. Although the image will be "fuzzy," the visual sensitivity is sufficient to convey the majority of the data contained in image 60. Each successive band adds additional image detail contained in image 60. Thus, depending on the time available to transmit the image data or the bandwidth available for transmission, one or more of Band 1–Band 3 may be eliminated from the bit stream or image file without significantly affecting the resulting image.

Figure 5A:
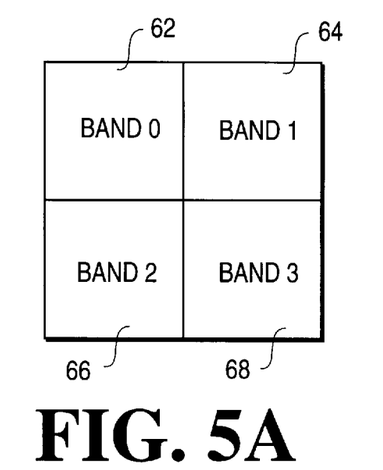
FIGS. 5A–5C illustrate the transformation of the four bands shown in FIG. 3 into sixteen separate bands.
Figure 5B:
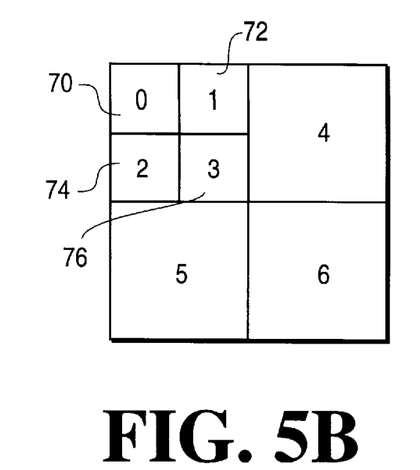
Figure 5C:
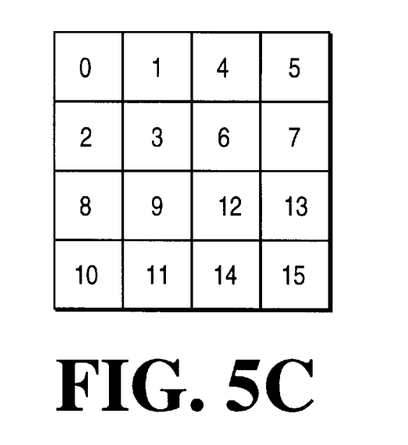

FIG. 3 above illustrates the transformation or decomposition of image 60 into four separate bands 62–68. In a particular embodiment of the invention, each band 62–68 is further transformed or decomposed into four additional bands. For example, FIG. 5A illustrates bands 62–68 after the first transformation. As illustrated in FIG. 5B, Band 0 is transformed into four separate bands 70, 72, 74, and 76. The remaining three bands 64-68 are decomposed in the same manner, resulting in 16 separate image bands (numbered 0–15) as shown in FIG. 5C. By performing this second level of transformation, a wider range of scalability is provided. Thus, up to 16 different levels of image detail may be provided based on the available bandwidth or the rate of transmission available in a particular system. For example, in a system with minimal bandwidth or minimal transmission time, only the first few bands of data (such as Bands 0–2) are transmitted. In systems having greater bandwidth resources or increased available transmission time, additional bands of data (such as Bands 0–9) are transmitted. Thus, 16 different levels of scalability are provided by performing two wavelet transformations, rather than the four levels provided by a single wavelet transformation.

Figure 6:
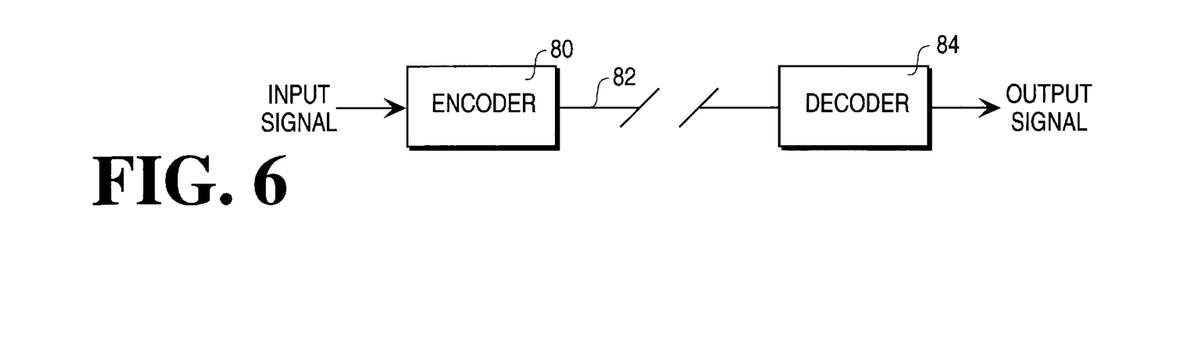
FIG. 6 illustrates a block diagram of an embodiment of an image processing system.

FIG. 6 illustrates a simplified block diagram of an image processing system. An input signal representing a video image is provided to an encoder 80. Encoder 80 performs wavelet decompositions and other necessary operations to compress and encode the data into a desired data rate. Encoder 80 then transmits the encoded signal across communication medium 82 to a decoder 84. Decoder 84 reconstructs the video image from the encoded signal received on communication medium 82. Wavelet recomposition is part of the reconstruction performed by decoder 84. Decoder 84 then generates an output signal representative of the reconstructed video image.

Figure 7:
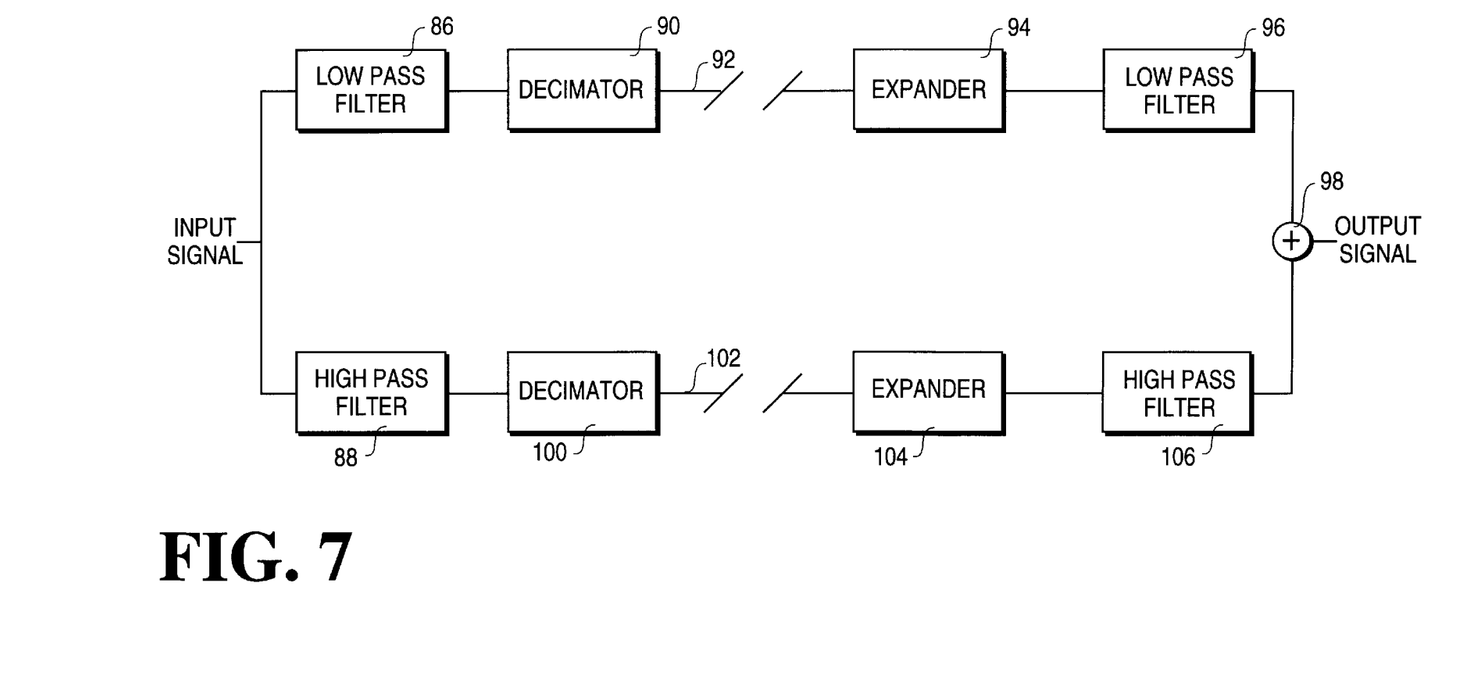
FIG. 7 illustrates a block diagram of the image processing system shown in FIG. 6 in greater detail.

FIG. 7 illustrates a block diagram of the image processing system shown in FIG. 6 in greater detail. The video input signal is provided to a low-pass filter 86 and a high-pass filter 88. Low-pass filter 86 allows the low frequency components of the input signal to pass through the filter to a decimator 90. Decimator 90 selects (or samples) every other data pixel passing through low-pass filter 86, thereby reducing the size of the transmitted signal by fifty percent. Decimator 90 transmits the selected pixel data across a communication medium 92 to an expander 94. Expander 94 inserts a new pixel value between each pair of pixel values to compensate for the pixel data removed by decimator 90.

Expander 94 transmits the reconstructed signal to a low-pass filter 96 which allows only the low frequency components of the signal to pass to the filter output. The output of low-pass filter 96 is provided to a summation circuit 98, which produces an output signal representative of the input signal.

As mentioned above, the input signal in FIG. 7 is provided to high-pass filter 88. High-pass filter 88 allows only the high frequency components of the input signal to pass through the filter. These high frequency components are provided to a decimator 100. Decimator 100 operates in a manner similar to decimator 90 by selecting every other pixel for transmission across a communication medium 102. An expander 104 operates in a manner similar to expander 94 by inserting a new pixel value between each pair of received pixels. This insertion of new pixel values compensates for the pixel data removed by decimator 100. The signal generated by expander 104 is provided to a high-pass filter 106, which allows only the high frequency components of the signal to pass through the filter. These high frequency components of the signal are provided to summation circuit 98, which sums together the signal components provided by low-pass filter 96 and high-pass filter 106. Summation circuit 98 then generates an output signal representing the reconstructed input signal.

A digital filter operates by applying one or more weighting values (or coefficients) to a particular set of pixel values. The digital filter multiplies each coefficient with an associated pixel value. The digital filter then adds together the multiplication results to calculate a filtered pixel value at a particular location in the image. The digital filter moves sequentially along each row (or each column) of pixels in the image until the entire image has been filtered. A filter delay is typically associated with this type of filtering operation.

In the case of 2-dimensional image data, the filter delay appears as the wrap-around of the image edges (i.e., the image shifts due to the filter delay). The longer the filter is (i.e., more coefficients), the greater the image shift. Multi-level wavelet decomposition further increases the filter delay and the associated image shift. To compensate for these image shifts in a system utilizing multi-level wavelet decomposition, additional operations are performed by the encoder and the decoder. Embodiments of the present invention minimize the filter delay, thereby minimizing the magnitude of the associated image shift. By minimizing the filter delay, an image processing system can eliminate the need to calculate or compensate for the associated image shift.

Figure 8:
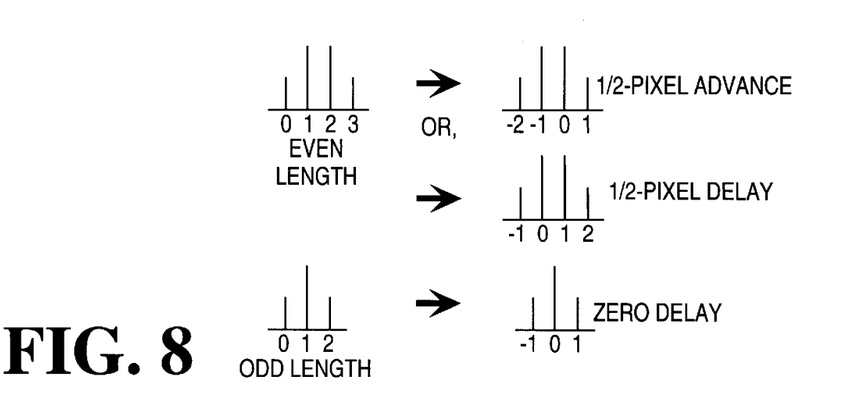
FIG. 8 illustrates examples of center-aligned filters for filters having an even length and an odd length.

A filter with an odd length (i.e., an odd number of coefficients) has no filter delay if the filter coefficients are shifted such that the origin aligns with the center of the filter. Similarly, a filter with an even length has a ½ pixel filter delay or a ½ pixel advance by properly shifting the filter coefficients. These properly aligned filters are referred to as "center-aligned filters." FIG. 8 illustrates examples of center-aligned filters for filters having an even length and an odd length.

Figure 9:
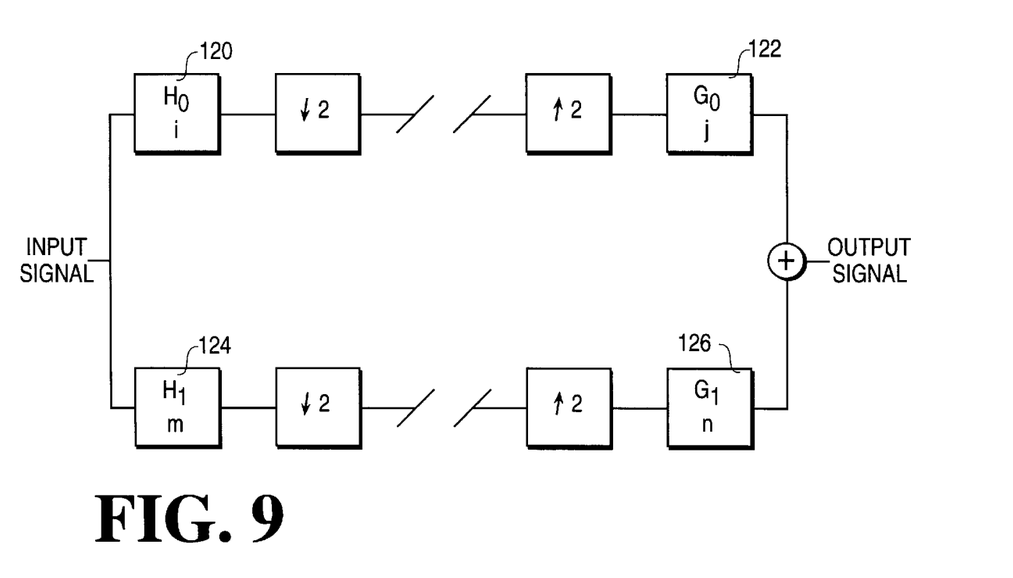
FIG. 9 illustrates an image processing system similar to the system shown in FIG. 7.

FIG. 9 illustrates a wavelet filter bank having four filters 120, 122, 124, and 126. Filters 120 and 122 are high-pass filters and filters 124 and 126 are low-pass filters. Shifting these four filters individually and making them all center-aligned filters can change the overall operation or behavior of the wavelet filter bank. In particular, a perfect reconstruction (PR) filter bank may lose its PR characteristics. The loss of PR characteristics is undesirable because PR is generally an important characteristic required for video coding applications. Embodiments of the present invention maintain the PR characteristics of the filter bank while minimizing the filter delay. As discussed below, a particular set of procedures and equations are utilized to ensure that the filters are adjusted in a manner that accurately reconstructs the video image.

As shown in FIG. 9, variables i, j, m, and n correspond to the shifting of coefficients associated with filters 120, 122, 124, and 126, respectively. Variables i, j, m, and n represent the number of positions that the coefficients are shifted. For example, if i=1, then the coefficients associated with filter 120 are shifted one pixel position to the right. Similarly, if i=−1, the coefficients associated with filter 120 are shifted one position to the left.

The output signal (i.e., the reconstructed video image) will be a perfect reconstruction of the input signal if variables i, j, m, and n satisfy the following conditions:

1. i+j=m+n
2. i and m are both even or both odd.

Figure 10:
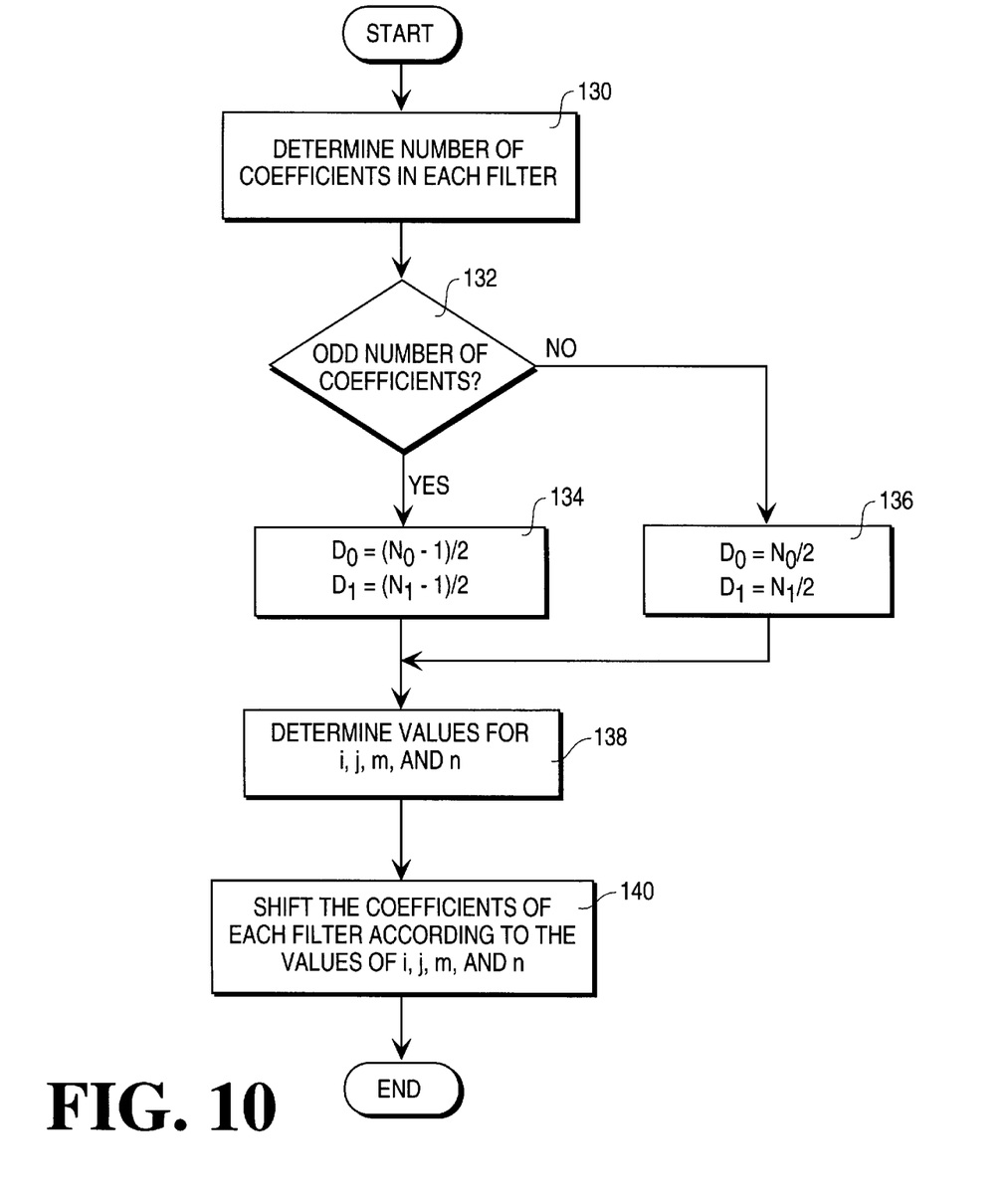
FIG. 10 is a flow diagram illustrating an embodiment of a procedure for determining the shifting of filter coefficients.

In one embodiment of the invention, the proper values for variables i, j, m, and n, are determined using the procedure illustrated in FIG. 10. Initially, the number of coefficients to be used with each filter is determined at step 130. Step 132 then determines whether the number of coefficients is odd. If the number of coefficients is odd, then the values for $D_0$ and $D_1$ are calculated at step 134 as follows:

$$D_0 = \frac{N_0 - 1}{2}$$

$$D_1 = \frac{N_1 - 1}{2}$$

In the above equations, $N_0$ is the number of coefficients in the filters on the decomposition side of the transmission system (e.g., filters 120 and 124 in FIG. 9). $N_1$ is the number of coefficients in the filters on the recomposition side of the of the transmission system (e.g., filters 124 and 126 in FIG. 9).

After the values of $D_0$ and $D_1$ have been calculated, the values of i, j, m, and n are determined from Table 1 below (step 138).

TABLE 1

| $D_0$ | $D_1$ | i | j | m | n |
|---|---|---|---|---|---|
| Even | Even | $D_0$ | $D_1$ | $D_1$ | $D_0$ |
| Odd | Odd | $D_0$ | $D_1$ | $D_1$ | $D_0$ |
| Even | Odd | $D_0$ | $D_1$ | $D_1 + 1$ | $D_0 - 1$ |
| Odd | Even | $D_0 + 1$ | $D_1 - 1$ | $D_1$ | $D_0$ |

As shown in Table 1, if the values of $D_0$ and $D_1$ are both even or both odd, then variables i and n are set to the values of $D_0$ and variables j and m are set to the value of $D_1$. If the values of $D_0$ and $D_1$ are not both even or both odd, then variables i, j, m, and n are set as indicated in the remaining two rows of Table 1.

If the number of coefficients used in the filters is even, then the values of $D_0$ and $D_1$ are calculated at step 136 as follows:

$$D_0 = \frac{N_0}{2}$$

$$D_1 = \frac{N_1}{2}$$

After the values for $D_0$ and $D_1$ have been calculated, the values for variables i, j, m, and n are determined from the values provided in Table 2 below.

TABLE 2

| $D_0$ | $D_1$ | i | j | m | n |
|---|---|---|---|---|---|
| Even | Even | $D_0$ | $D_1 + 1$ | $D_1$ | $D_0 + 1$ |
| Odd | Odd | $D_0 + 1$ | $D_1$ | $D_1 + 1$ | $D_0$ |
| Even | Odd | $D_0$ | $D_1 + 1$ | $D_1 + 1$ | $D_0$ |
| Odd | Even | $D_0 + 1$ | $D_1$ | $D_1$ | $D_0 + 1$ |

After determining the values of i, j, m, and n at step 138, the procedure continues to step 140 where the coefficients of each filter are shifted according to the values of i, j, m, and n.

By utilizing the procedures above for determining the shift associated with the coefficients of each filter, the invention eliminates the filter delay associated with previous systems. Therefore, the associated operations to determine and compensate for the filter delay are also eliminated.

The following example illustrates the procedure for calculating values for i, j, m, and n. In this example, filter 120 (FIG. 9) has five coefficients ($N_0=5$) and filter 122 (FIG. 9) has three coefficients ($N_1=3$). Thus, both filters 120 and 122 have an odd number of coefficients, and the following equations are used to calculate $D_0$ and $D_1$.

$$D_0 = \frac{N_0 - 1}{2}$$

$$D_1 = \frac{N_1 - 1}{2}$$

For this example, $D_0=2$ and $D_1=1$. Since $D_0$ is even and $D_1$ is odd, Table 1 indicates the following values:

$$i = D_0 = 2 \qquad j = D_1 = 1$$
$$m = D_1 + 1 = 2 \qquad n = D_0 - 1 = 1$$

Using the system shown in FIG. 9, filter 120 shifts its coefficients two positions to the right (i=2). Similarly, filter 122 shifts its coefficients one position to the right (j=1), filter 124 shifts its coefficients two positions to the right (m=2), and filter 126 shifts its coefficients one position to the right (n=1). Thus, the values of i, j, m, and n satisfy the requirement that i+j=m+n. Additionally, the requirement that i and m are both even or both odd is satisfied (both i and m are even).

Figure 11:
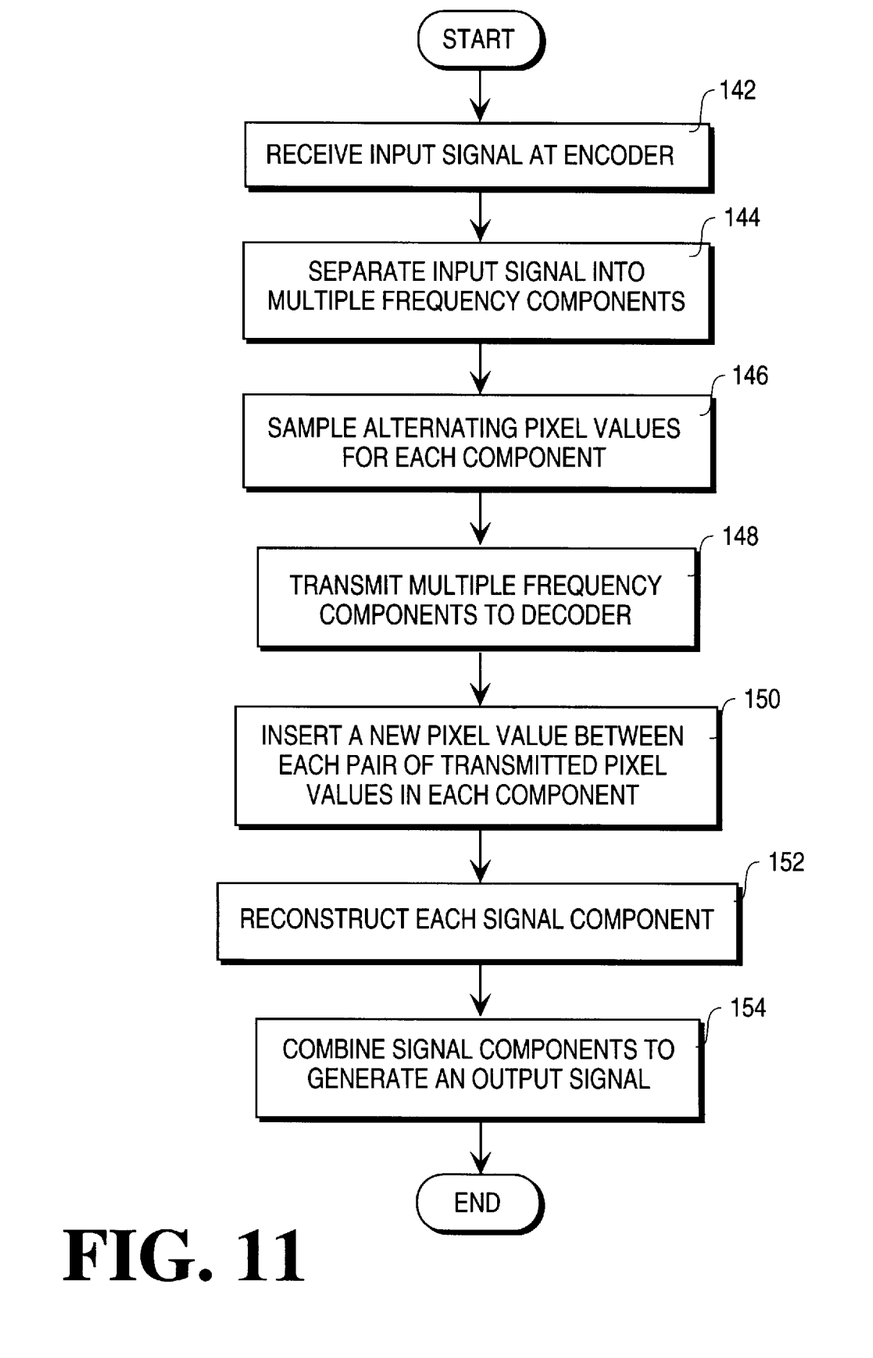
FIG. 11 is a flow diagram illustrating an embodiment of a procedure for transmitting data between a source and a destination.

Referring to FIG. 11, a flow diagram illustrates an embodiment of a procedure for transmitting data between a source and a destination. At step 142, the image processing system (such as the system illustrated in FIG. 9) receives an input signal at the encoder. Step 144 separates the input signal into multiple frequency components. This separation may be performed by filters 120 and 124 in FIG. 9. At step 146, alternate pixel values are sampled for each frequency component. Step 148 transmits the multiple frequency components to a decoder. The decoder inserts a new pixel value between each pair of transmitted pixel values at step 150. At step 152, each signal component is reconstructed (e.g., using filters 122 and 126 in FIG. 9). Step 154 combines the signal components to generate an output signal. As discussed above, the shifting of the filter coefficients affects the operation of filters 120–126. By shifting the filter coefficients, the image processing system minimizes or eliminates the filter delays associated with previous systems.

The procedures and equations discussed above maintain the perfect reconstruction (PR) characteristics of a filter bank. The following proof illustrates that the above procedures and equations maintain PR filter bank characteristics.

If a wavelet decomposition module is coupled directly to a wavelet recomposition module, then the input-output relationship of the whole wavelet system can be described in the Z-transform domain as the following:

$$Y(z) = \tfrac{1}{2} X(z)[H_0(z)G_0(z) + H_1(z)G_1(z)] = \tfrac{1}{2} X(-z)[H_0(-z)G_0(z) + H_1(-z)G1(z)]$$

The transform term is defined as:

$$T(z) = H_0(z)G_0(z) + H_1(z)G_1(z)$$

The aliasing term is defined as:

$$A(z) = H_0(-z)G_0(z) + H_1(-z)G_1(z)$$

Based on the above equations, the input-output relationship can be written as:

$$Y(z) = \tfrac{1}{2} X(z)T(z) + \tfrac{1}{2} X(-z)A(z)$$

A perfect reconstruction (PR) filter bank $\{H_0, G_0, H_1, G_1\}$ has the characteristic that for any input $X(z)$, the output is always the scaled and/or shifted version of the input. In other words, $Y(z) = cX(z)z^d$, where c is a constant (scale factor) and d is an integer (shift). The filter bank $\{H_0, G_0, H_1, G_1\}$ is a PR filter bank if:

$T(z) = cZ^d$ and $A(z) = 0$

A shifted filter bank $\{z^i H_0, z^j G_0, z^m H_1, z^n G_1\}$ (i, j, m, and n are integers) can be denoted as the filter bank $\{H'_0, G'_0, H'_1, G'_1\}$, where:

$$H'_0(z) = z^i H_0(z) \qquad G'_0(z) = z^j G_0(z)$$
$$H'_1(z) = z^m H_1(z) \qquad G'_1(z) = z^n G_1(z)$$

Thus, $\{H'_0, G'_0, H'_1, G'_1\}$ is a PR filter bank if:

$$T(z) = H'_0(z)G'_0(z) + H'_1(z)G'_1(z) = z^{i+j}H_0(z)G_0(z) + z^{m+n}H_1(z)G_1(z) = c'Z^{d'}$$

and $$A'(z) = H'_0(-z)G'_0(z) + H'_1(-z)G'_1(z) = (-1)^i z^{i+j} H_0(z)G_0(z) + (-1)^m z^{m+n} H_1(z)G_1(z) = 0$$

Thus, if $T(z) = cZ^d$ and $A(z) = 0$ then the above equations for $T'(z)$ and $A'(z)$ are only satisfied if:

i+j=m+n and $(-1)^i = (-1)^m$ (i.e., i and m are both even or both odd).

Figure 12:
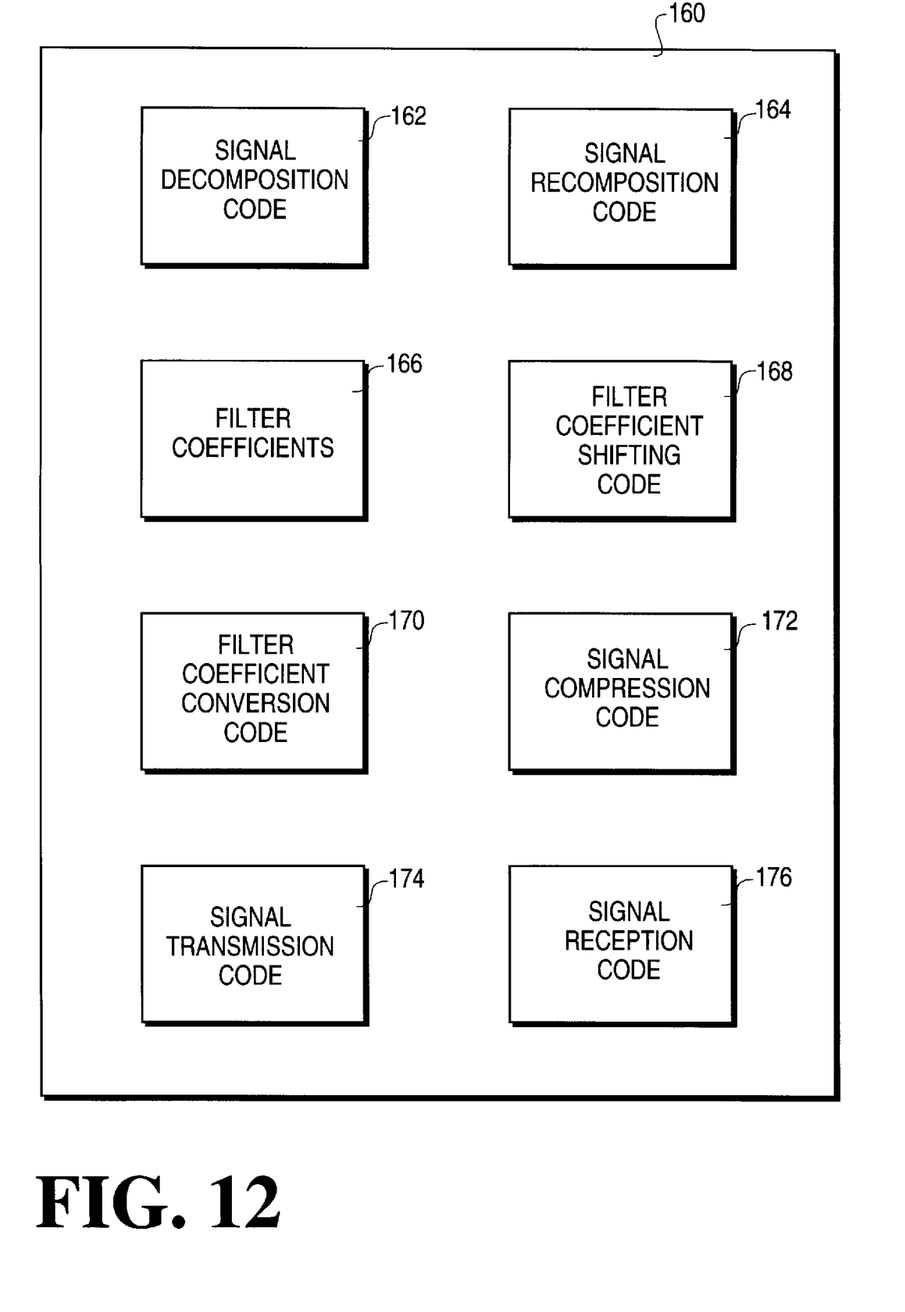
FIG. 12 illustrates an embodiment of a processor-readable medium containing various information used by a computer or other processing device.

FIG. 12 illustrates an embodiment of a processor-readable medium 160 containing various information used by a computer or other processing device. The embodiment illustrated in FIG. 12 is suitable for use with the signal processing systems discussed above. The information stored on medium 160 is used to perform the various operations and procedures described above. Processor-readable medium 160 may also be referred to as a computer-readable medium. Processor-readable medium 160 may be any type of magnetic, optical, or electrical storage medium including a disk, diskette, CD-ROM, memory device, or similar storage medium.

Processor-readable medium 160 includes signal decomposition code 162 that decomposes a received signal into multiple signal components. Signal recomposition code 164 recomposes the multiple signal components into the original signal. Filter coefficients 166 are used to filter various signals, as described above. Filter coefficient shifting code 168 shifts the filter coefficients to minimize filter delay. Filter coefficient conversion code 170 converts the filter coefficients into integer values. Signal compression code may additionally compress various signals prior to transmission. Signal transmission code 174 and signal reception code 176 are used to transmit data from a source to a destination.

Alternate embodiments of processor-readable medium 160 may include only a portion of the information and instruction code shown in FIG. 12. Additionally, other code sequences, instructions, and information may be generated during execution of the various procedures described herein. Those of ordinary skill in the art will appreciate that various code sequences, instructions, and procedures may be utilized by an end-system to implement the teachings of the present invention.

In the above description of the invention, various examples have been illustrated with respect to the processing of video data. However, the systems and procedures described above may also be applied to other types of data, such as audio data.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for shifting filter coefficients in a filter system having a plurality of high-pass filters and a plurality of low-pass filters, wherein each filter has associated filter coefficients, the method comprising the steps of:

selecting a filter shift value for each filter such that the sum of the shift values for the low-pass filters equals the sum of the shift values for the high-pass filters; and shifting the filter coefficients for each filter according to the shift value associated with the filter.

2. The method of claim 1 further including the step of selecting filter shift values such that the filter shift value associated with a first low-pass filter is odd and the filter shift value associated with a first high-pass filter is odd.

3. The method of claim 1 further including the step of selecting filter shift values such that the filter shift value associated with a first low-pass filter is even and the filter shift value associated with a first high-pass filter is even.

4. The method of claim 1 wherein the filter system is a perfect reconstruction filter bank.

5. The method of claim 1 wherein the filters are center-aligned filters.

6. A method for decomposing a data stream using a plurality of filters, wherein each filter includes a plurality of associated coefficients, the method comprising the steps of:

shifting the plurality of coefficients associated with each filter to minimize transmission delay associated with the data stream;

dividing the data stream into a plurality of bands; and filtering each band using the associated filter, wherein the associated filter applies its shifted coefficients to the band to generate a filter output signal.

7. The method of claim 6 wherein the data stream is a video data stream that is divided into a plurality of image bands.

8. The method of claim 6 wherein the step of dividing the data stream into a plurality of bands includes separating the high frequency components of the data stream from the low frequency components of the data stream.

9. The method of claim 6 further including the step of converting the plurality of coefficients associated with each filter to integers.

10. The method of claim 6 wherein the step of shifting the plurality of coefficients includes shifting the coefficients such that the sum of the shifts for the filters associated with each band are equal.

11. The method of claim 6 wherein the plurality of filters is a perfect reconstruction filter bank.

12. A method for transmitting a received input signal, the method comprising the steps of:

decomposing the received input signal into multiple frequency components using a first plurality of filters, the first plurality of filters including associated coefficients shifted to minimize transmission delay;

transmitting the multiple frequency components to a decoder; and recomposing the input signal from the multiple frequency components using a second plurality of filters.

13. The method of claim 12 wherein the step of decomposing the received input signal into multiple frequency components includes separating the high frequency components of the input signal from the low frequency components of the input signal.

14. The method of claim 12 wherein the coefficients associated with the first plurality of filters are shifted such that the sum of the shifts for the filters associated with each frequency component are equal.

15. The method of claim 12 wherein the step of transmitting multiple frequency components transmits alternating data elements.

16. An apparatus for transmitting a received input signal, the apparatus comprising:

a first plurality of filters configured to decompose the received input signal into multiple frequency components, each of the first plurality of filters having an associated filter coefficient, wherein the first plurality of filters is configured to shift the filter coefficients to minimize transmission delay;

a transmitting device coupled to the first plurality of filters and configured to transmit the decomposed signal to a receiving device; and a second plurality of filters coupled to the receiving device and configured to recompose the input signal from the multiple frequency components.

17. The apparatus of claim 16 wherein the first plurality of filters is configured to shift the filter coefficients such that the sum of the shifts for the filters associated with each frequency component are equal.

18. The apparatus of claim 16 wherein the first plurality of filters are center-aligned filters.

19. A computer software product including a medium readable by a processor, the medium having stored thereon:

a first sequence of instructions which, when executed by the processor, causes the processor to decompose a received input signal into multiple frequency components using a first plurality of filters, the first plurality of filters including associated coefficients shifted to minimize transmission delay;

a second sequence of instructions which, when executed by the processor, causes the processor to transmit the multiple frequency components to a decoder; and a third sequence of instructions which, when executed by the processor, causes the processor to recompose the input signal from the multiple frequency components using a second plurality of filters.

20. The method of claim 19 wherein the first sequence of instructions includes separating the high frequency components of the input signal from the low frequency components of the input signal.

21. The method of claim 19 wherein the first sequence of instructions shifts the filter coefficients associated with the first plurality of filters such that the sum of the shifts for the filters associated with each frequency component are equal.

* * * * *